United States Patent Office 3,118,466
Patented Jan. 21, 1964

3,118,466
PRESSURE OPERATED BY-PASS VALVE FOR PUMPING APPARATUS
Marshall U. Bagwell, Houston, Tex., assignor to The Texas Pipe Line Company, Houston, Tex., a corporation of Texas
Filed Jan. 31, 1961, Ser. No. 86,237
1 Claim. (Cl. 137—491)

This invention relates to a valve, and, more particularly to a valve for use in conjunction with pumping apparatus. In one of its more specific aspects, this invention relates to a valve for use in a bypass through which fluid passes under pressure from the discharge side of a positive displacement pump and returns to the intake side of the pump.

In a positive displacement pump used for transporting fluid under pressure, it is desirable to provide a bypass. In this manner, a portion of the fluid passing from the discharge side of the pressure system, i.e. pump, is bled off through a bypass. The fluid entering the bypass is returned to the intake or suction side of the pump. By such a method, it is possible to maintain the amount of fluid passing through the pump at a constant level. Where all of the fluid transported by a positive displacement pump flows through the bypass, the starting load on the motor is relieved. When the motor has reached the desired operating level, a valve may be employed to close this bypass and allow the pump to operate in its normal manner.

It is an object of the invention to provide a self-actuating valve effective in opening and closing the bypass used in conjunction with pumping apparatus. Another object of the invention is to provide a valve that will serve as a relief valve to protect the pump against excessive discharge pressure. It is another object of the invention to provide a valve of the above type whereby fluid flowing through the bypass is utilized in exerting hydraulic pressure to close the valve.

These together with other objects and advantages of the present invention will best be understood by referring to the following detailed specification and preferred embodiment thereof, and the accompanying drawing. In the drawing.

In general, the valve assembly of the present invention includes, in combination with a bypass in a pipeline having a means to supply fluid pressure, a valve body having a valve seat and an inlet and outlet for connection with the bypass, and a cylinder extending outwardly from the valve body. In the valve assembly, there is provided a valve disc mounted on a valve stem for axial movement relative to the valve body and normally biased to an open position relative to the valve seat. The stem extends longitudinally into the cylinder and has a piston slidably mounted therein. A fluid passage establishes fluid communication between the inlet zone of the valve and the space above the piston, the passage advantageously extending longitudinally through the stem. The fluid pressure in the pipeline permits flow of the fluid, through the fluid passage to the space above the piston thereby urging a pressure on the piston opposing the force exerted by the bias. When the pressure is sufficient to overcome the force of the bias, the piston will move toward the valve seat, and by reason of the connecting stem, will move the valve disc in a closing direction and into contact with the valve seat.

Figure 1:
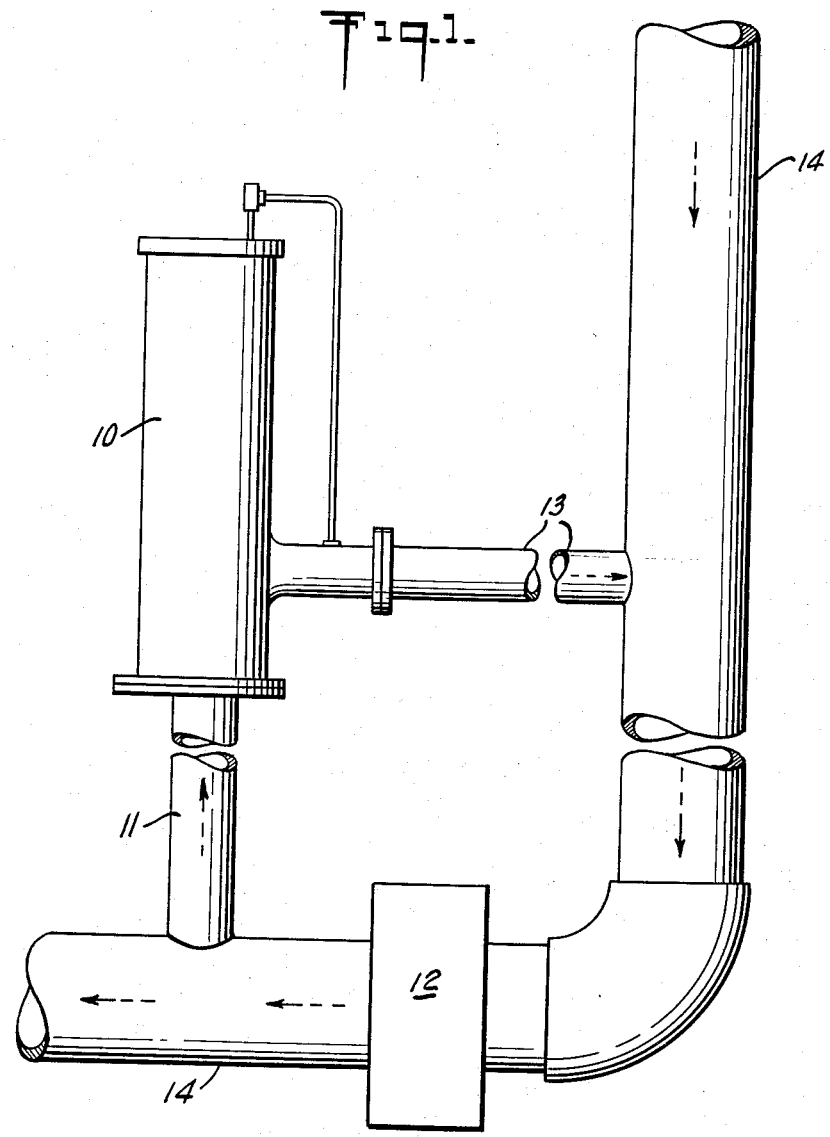
FIGURE 1 is an elevation showing a typical pipeline having a bypass and a valve connected to the bypass in accordance with the invention.

Referring to FIGURE 1, there is shown a valve 10 connected to the bypass comprising conduits 11 and 13 and extending between the discharge side of pump 12 in pipeline 14 and the intake or suction side of line 14. Pump 12 may be driven by any suitable power source such as an electric motor (not shown). Fluid transported in the line 14 in the direction indicated by the arrows is delivered to the pump 12 and discharged at an increased pressure at the opposite end thereof.

Figure 2:
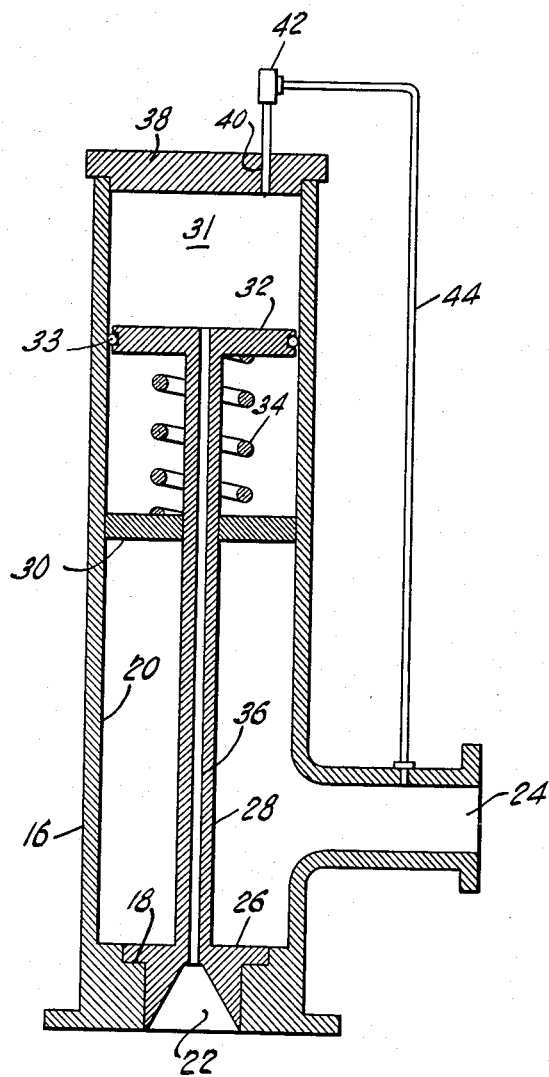
FIGURE 2 is an enlarged longitudinal sectional elevation illustrating the internal elements of the valve.

Referring now to FIGURE 2 showing the valve structure of our invention in detail, the valve assembly comprises a valve body 16 having a valve seat 18, an outwardly extending cylinder 20 and an inlet 22 and an outlet 24. A valve disc 26, preferably of the throttling type, is connected to valve stem 28 mounted for axial movement relative to the valve body, and arranged to cooperate with the valve seat 18 of the valve body. Inlet 22, advantageously coaxial with the valve seat 18, and the outlet 24, located above, i.e. downstream, the valve seat 18, are in junction with bypass conduits 11 and 13, respectively, and establish fluid communication therewith, and in turn, with pipeline 14.

In cylinder 20 is mounted a partition 30 extending transversely of the valve stem and defining a cylinder bore 31. Valve stem 28 extends through the fixed partition 30. A piston 32 is rigidly connected to the valve stem 28 above the partition 30 and slidably and sealingly mounted in the cylinder bore 31 for axial travel relative to the valve body. The top surface of the piston has an area substantially greater than the surface area of the valve disc on the inlet side. The piston 32 may be provided with a suitable packing material or piston ring 33 to insure a tight seal. A coil spring 34, or the like, is disposed between the partition and the piston, the spring preferably surrounding the stem as shown. The coil spring biases the piston upward to an open position causing the valve disc 26 to be raised from the valve seat 18. The valve stem 28 is provided with a longitudinal passage 36 for establishing communication between the cylinder bore space above the piston and the inlet zone of the valve. Cylinder bore 31 is closed at its upper end by closure member 38 except for a bleeder or leakoff port 40 provided with an appropriate relief valve 42 to permit the release of excess hydraulic pressure in the cylinder bore 31. Fluid released through the bleeder may be passed to the outlet 24 of valve 10 via conduit 44.

In operation, the pump 12 creates the necessary pressure differential to transport the fluid in pipeline 14 in the direction indicated by the arrows. In starting the pump, it is desirable to relieve the starting load on the motor operating the pump by recycling through the bypass at least a portion of the fluid passing through line 14. During operation, a pressure differential is established between the discharge side of the pump in the pipeline and the intake or suction side of the pipeline. By reason of this difference in pressure, all of the fluid flowing through the pump is passed through conduit 11, through valve 10 and returned to the pump via conduit 13. The pressure differential causes a portion of the fluid entering the valve to pass through the longitudinal passage 36 in stem 28 to the cylinder bore 31 above piston 32. When the fluid pressure in the cylinder bore has reached an amount that its pressure on the piston is sufficient to more than balance the force exerted by the spring on the piston and by the pressure on the valve disc, the piston will move downwardly relative to the valve seat 18 and toward the valve seat, and by reason of the connecting stem, will move the valve disc 26 in a closing direction. The force exerted by the spring may be predetermined so as to resist the axial movement of the piston and the stem until the motor has achieved a desired operating level. When such predetermined force is exceeded by the hydraulic pressure, the stem moves downwardly relative to the seat, the spring being compressed between the piston and the partition.

In the event the pump discharge increases beyond what is desired such that the hydraulic pressure in the cylinder bore 31 above the piston 32 becomes excessive, the pressure is released by reason of the bleeder 40 and relief valve 42. The bleeder carries off the excess fluid which is returned to the intake or suction side of the pipeline via conduit 44. This bleeding into the suction line will upset the opposing forces exerted by valve disc 26 and spring 34 and fluid pressure on piston 32 which in turn will cause the valve disc to raise against the opposing force of the piston and consequently open the valve proportionately. When the pressure in the cylinder 31 drops, the relief valve 42 will shut off. The opposing forces in the valve will then be re-established thereby resetting the valve disc 26 to a closing position and cutting off the bypass.

Having thus described the invention generally and in terms of a specific embodiment thereof, I claim:

A valve effective to open and close a bypass for a positive displacement pump comprising a valve body having an inlet and an outlet adapted to be joined respectively to the discharge and intake sides of such a pump, a valve seat in said valve body, a cylinder extending outwardly from said valve body, said inlet being coaxial with said seat and said outlet extending from said valve body and located downstream with respect to said valve seat, a valve disc, a valve stem connected to said valve disc for moving said valve disc to and from registration with said valve seat, a partition mounted in said outwardly extending cylinder defining a cylinder bore in the outer portion thereof, a closure member for said cylinder bore, said valve stem extending through said partition and into said cylinder bore, a piston rigidly connected to the end of said valve stem in said cylinder bore and slidably and sealingly mounted therein, a spring surrounding said valve stem and disposed between said partition and said piston to bias said valve disc to an open position relative to said seat, a fluid passage through said valve disc, said valve stem and said piston to permit flow of fluid to the cylinder bore beyond said piston for urging said piston against the bias of said spring to move said valve disc into closing contact with said valve seat when the pressure exerted on said piston is sufficient to overcome the force exerted by said spring and said valve disc, and a bleeder means responsive to excess pressure in said cylinder bore beyond said piston interconnecting said outlet through said closure member to said bore.

References Cited in the file of this patent
UNITED STATES PATENTS

| | | |
|---|---|---|
| 673,732 | Shoemaker | May 7, 1901 |
| 894,102 | Banjock | July 21, 1908 |
| 934,081 | Mills | Sept. 14, 1909 |
| 1,814,530 | Spence | July 14, 1931 |
| 2,839,077 | Kristensson | June 17, 1958 |
| 2,918,081 | Lauer | Dec. 22, 1959 |
| 2,955,614 | Meynig | Oct. 11, 1960 |